United States Patent [19]
Gatsis

[11] 4,303,634
[45] Dec. 1, 1981

[54] METHOD OF CATALYST PREPARATION

[75] Inventor: John G. Gatsis, Des Plaines, Ill.

[73] Assignee: UOP Inc., Des Plaines, Ill.

[21] Appl. No.: 189,387

[22] Filed: Sep. 19, 1980

Related U.S. Application Data

[63] Continuation-in-part of Ser. No. 73,176, Sep. 7, 1979, abandoned.

[51] Int. Cl.³ .................... C01B 17/20; C01G 39/06; B01J 27/04
[52] U.S. Cl. ................................ 423/561 R; 252/439
[58] Field of Search .................... 252/439; 423/561 R, 423/562

[56] References Cited

U.S. PATENT DOCUMENTS

| | | | |
|---|---|---|---|
| 3,161,585 | 12/1964 | Gleim et al. | 208/264 |
| 4,134,825 | 1/1979 | Bearden et al. | 208/108 |
| 4,243,553 | 1/1981 | Naumann et al. | 252/439 |

Primary Examiner—W. J. Shine
Attorney, Agent, or Firm—James R. Hoatson, Jr.; John G. Cutts, Jr.; William H. Page, II

[57] ABSTRACT

A novel method of preparing an unsupported molybdenum sulfide catalyst utilized in the processing of hydrocarbon feedstocks containing asphaltenes and organometallic compounds.

3 Claims, No Drawings

METHOD OF CATALYST PREPARATION

CROSS-REFERENCE TO RELATED APPLICATION

This application is a continuation-in-part of application Ser. No. 73,176 filed Sept. 7, 1979, and now abandoned, all the teachings of which application are incorporated herein by specific reference thereto.

BACKGROUND OF THE INVENTION

Crude petroleum oil, and the heavier hydrocarbon fractions and/or distillates obtained therefrom, generally contain nitrogenous and sulfurous compounds in large quantities. In addition, crude oil, and the heavier hydrocarbon fractions contain quantities of metallic contaminants which exert detrimental effects upon the catalyst utilized in various processes to which the crude oil or heavy hydrocarbon fraction is ultimately subjected. The most common metallic contaminants are nickel and vanadium, although other metals including iron, copper, etc., are often present. These metals may occur in a variety of forms; they may exist as metal oxides or as sulfides, introduced into the crude oil as metallic scale or particles; in the form of soluble salts of such metals; usually, however, they exist in the form of organo-metallic compounds such as metal porphyrins and the derivatives thereof.

Although the metallic contaminants existing as oxide or sulfide scale may be removed, at least in part, by a relatively simple filtering technique, and the water-soluble salts are at least in part removable by washing and subsequent dehydration, a much more severe treatment is generally required to remove the organometallic compounds to the degree required in order that the resulting crude oil or heavy hydrocarbon fraction is suitable for further processing. In addition to the organometallic compounds, including metal porphyrins, crude oils contain greater quantities of sulfurous and nitrogenous compounds that are found in light hydrocarbon fractions such as gasoline, kerosene, light gas oil, etc. For example, a Wyoming sour crude, having a gravity of 23.2° API at 60° F., contains about 2.8% by weight of sulfur and about 2700 ppm of total nitrogen. The nitrogenous and sulfurous compounds are converted, upon being subjected to a treating process, into hydrocarbons, ammonia, and hydrogen sulfide, the latter being readily removed from the system in a gaseous phase. Reduction in the concentration of the metallic contaminants is not as easily achieved to the extent that the crude oil or heavy hydrocarbon charge stock becomes suitable for further processing. Notwithstanding that the concentration of these compounds, such as metal porphyrins, is relatively small, for example, less than about 10 ppm, calculated as the elemental metal, subsequent processing techniques will be adversely affected thereby. For example, when a hydrocarbon charge stock containing metals in excess of about 3.0 ppm, is subjected to a cracking process for the purpose of producing lower-boiling components, the metals become deposited upon the catalyst employed, steadily increasing in quantity until such time as the composition of the catalytic composite is changed to the extent that undesirable results are obtained. That is to say, the composition of the catalytic composite, which is closely controlled with respect to the nature of the charge stock being processed and to the desired product quality and quantity, is changed considerably as the result of the deposition of the metallic contaminants onto the catalyst. This change in the catalyst results in a change in the characteristics of the catalyst. Such an effect is undesirable with respect to the cracking process, since the deposition of metallic contaminants upon the catalyst tends to result in a lesser quantity of valuable liquid product, and a larger amount of hydrogen and coke, the latter producing relatively rapid catalyst deactivation. The presence of organic metal compounds, including metal porphyrins, affects deleteriously other processes including catalytically reforming, isomerization, hydrodealkylation, etc.

In addition to the foregoing described contaminating influences, crude oils and other heavier hydrocarbon fractions, generally contain large quantities of pentane-insoluble material. For example, the Wyoming sour crude consists of about 8.37% by weight of pentane-insoluble asphaltenes which are hydrocarbonaceous compounds considered as coke-precursors having the tendency to become immediately deposited within the reaction zone and onto the catalytic composite employed in the form of a gummy hydrocarbonaceous residue. This constitutes a large loss of charge stock; it is economically desirable to convert such asphaltenes into useful hydrocarbon oil fractions.

The use of a slurry catalyst system for the conversion of hydrocarbon feedstock containing asphaltenes and organometallic compounds is well-known. For example, U.S. Pat. No. 3,161,585 describes such a process. The first preferred method of the above-mentioned patent for catalyst preparation comprises thermally decomposing an organometallic complex in admixture with the petroleum hydrocarbon charge stock to be treated. The second preferred method indicates that molybdenum metal may be dissolved in a suitable solvent, which is taught as comprising water, an alcohol or an ether. The '585 patent teaches that in both preferred methods some contact is necessitated with the petroleum charge stock to be treated.

Another U.S. Pat. No. 4,134,825 teaches that insoluble molybdenum oxide powder is not a feasible starting material to prepare an unsupported molybdenum sulfide catalyst.

OBJECTS AND EMBODIMENTS

The object of the present invention is to provide a novel method of preparing a molybdenum sulfide catalyst utilized in the processing of hydrocarbon feedstocks containing asphaltenes and organometallic compounds.

The present invention teaches the preparation of a finely divided, unsupported catalyst useful in a slurry process, and which will not effect extensive erosion of the reaction system. A slurry process yields a liquid hydrocarbon product which is more suitable for further processing without experiencing the difficulties otherwise resulting from the presence of the hereinabove described contaminants. A slurry process is particularly advantageous in effecting the removal of the organic metal compounds without significant product yield loss, while simultaneously converting pentane-insoluble material into pentane-soluble liquid hydrocarbons.

In a broad embodiment, the present invention involves a method of preparing an unsupported molybdenum sulfide catalyst utilized in hydrorefining a hydrocarbon charge stock.

A more limited embodiment of the present invention affords a method of preparing an unsupported molybdenum sulfide catalyst which comprises reacting molybdenum oxide with ammmonium sulfide at a temperature and pressure selected to produce an ammonium salt of molybdenum sulfide and thereafter thermally decomposing said ammonium salt of molybdenum sulfide in a non-oxidative atmosphere to form said unsupported molybdenum sulfide catalyst.

DETAILED DESCRIPTION OF THE INVENTION

From the foregoing embodiments, it is readily ascertained that the method of the present invention involves the preparation of an unsupported molybdenum sulfide catalyst. The catalyst prepared in accordance with the method of the present invention comprises molybdenum which is derived from molybdenum oxide. A suitable molybdenum oxide which may be used as the molybdenum catalyst precursor is $MoO_3$. The catalyst is prepared by initially contacting the molybdenum oxide with ammonium sulfide to form an ammonium salt of the molybdenum sulfide. The resulting ammonium salt of the molybdenum sulfide is thermally decomposed in a non-oxidative atmosphere and molybdenum sulfide catalyst is recovered. Any suitable non-oxidative atmosphere may be used but preferred atmospheres include hydrogen and nitrogen.

In order to ensure complete conversion of the molybdenum oxide it is preferable to add from about 110% to about 200% of the stoichiometric requirement of ammonium sulfide.

The reaction of the molybdenum oxide and the ammonium sulfide may suitably be performed at a temperature in the range of about 100° C. to about 225° C. and at a pressure from about 100 psig to about 700 psig. Preferred reaction conditions are a temperature of 200° C. and a pressure of 500 psig. The resulting ammonium salt of the molybdenum sulfide is then thermally decomposed in a non-oxidative atmosphere to yield a molybdenum sulfide catalyst. The thermal decomposition may be suitably performed at a temperature of from about 200° C. to about 300° C. and at ambient pressure. Preferred decomposition conditions are at a temperature of 250° C. and ambient pressure. Any suitable non-oxidative atmosphere may be used but preferred atmospheres include hydrogen and nitrogen.

The following example is given to illustrate the method of the present invention and is not intended as an undue limitation on the generally broad scope of the invention as set out in the appended claims.

EXAMPLE

This example describes a preferred embodiment of the present invention. About 30 grams of $MoO_3$ is contacted with 125% of the stoichiometric amount of ammonium sulfide to form an ammonium salt of the molybdenum sulfide at a temperature of about 150° C. and a pressure of 500 psig. The resulting ammonium salt of molybdenum sulfide is then thermally decomposed at a temperature of 260° C. under a hydrogen blanket and about 15 grams of molybdenum sulfide catalyst is recovered.

The foregoing specification and example clearly illustrate the method of the present invention for the preparation of an unsupported molybdenum sulfide catalyst and the advantages derived therefrom.

I claim as my invention:

1. A method of preparing an unsupported molybdenum sulfide catalyst which comprise reacting molybdenum oxide with ammonium sulfide at a temperature and pressure selected to produce an ammonium salt of molybdenum sulfide and thereafter thermally decomposing said ammonium salt of molybdenum sulfide in a non-oxidative atmosphere to form said unsupported molybdenum sulfide catalyst.

2. The method of preparation of claim 1 wherein said non-oxidative atmosphere comprises hydrogen.

3. The method of preparation of claim 1 wherein said non-oxidative atmosphere comprises nitrogen.

* * * * *